US010883572B2

(12) United States Patent
Sasaki et al.

(10) Patent No.: US 10,883,572 B2
(45) Date of Patent: Jan. 5, 2021

(54) CYCLOID SPEED REDUCER (71) Applicants: NIPPON THOMPSON CO., LTD., Tokyo (JP); CHIBA INSTITUTE OF TECHNOLOGY, Narashino (JP)

(72) Inventors: Satoshi Sasaki, Mino (JP); Hideaki Yamato, Narashino (JP); Takayuki Furuta, Narashino (JP)

(73) Assignees: NIPPON THOMPSON CO., LTD., Tokyo (JP); CHIBA INSTITUTE OF TECHNOLOGY, Narashino (JP)

( * ) Notice: Subject to any disclaimer, the term of this patent is extended or adjusted under 35 U.S.C. 154(b) by 55 days.

(21) Appl. No.: 16/293,021

(22) Filed: Mar. 5, 2019

(65) Prior Publication Data

US 2019/0285143 A1   Sep. 19, 2019

(51) Int. Cl.
*F16H 1/34* (2006.01)
*F16H 57/08* (2006.01)
*F16H 57/023* (2012.01)
*F16H 1/32* (2006.01)

(52) U.S. Cl.
CPC ............. *F16H 1/34* (2013.01); *F16H 57/023* (2013.01); *F16H 57/08* (2013.01); *F16H 2001/323* (2013.01)

(58) Field of Classification Search
CPC ........ F16H 49/001; F16H 1/34; F16H 57/023; F16H 57/08; F16H 2001/323
See application file for complete search history.

(56) References Cited

U.S. PATENT DOCUMENTS 5,261,679 A * 11/1993 Nakamura .......... B23B 31/1238
                                                          279/62
6,817,267 B2 * 11/2004 Kobayashi ............ F16H 49/001
                                                          74/640
2017/0059029 A1 * 3/2017 Sasaki ................. F16H 57/0486

FOREIGN PATENT DOCUMENTS

JP        2004211847 A    7/2004
JP        2017048852 A    3/2017

* cited by examiner

*Primary Examiner* — Randell J Krug
(74) *Attorney, Agent, or Firm* — Browdy and Neimark, PLLC (57) ABSTRACT A cycloid speed reducer has a housing for accommodating a piece of equipment. Outer pins in meshing engagement with cycloid gears of a reduction gear portion are incorporated into the housing as a sliding bearing. A lubrication ring for lubricating the outer pins is slidably incorporated into the housing. The outer pins are lubricated by the outer pin lubricating ring. Inner pins are lubricated by a lubricating ring. The pair of cycloid gears are lubricated via the outer pins and the inner pins. As a result, friction between components is reduced, whereby frictional resistance decreases and durability is enhanced. In addition, the cycloid speed reducer can be manufactured as a small, compact unit.

3 Claims, 5 Drawing Sheets

CYCLOID SPEED REDUCER

FIELD OF THE INVENTION

The present invention relates a compact, light weight cycloid speed reducer which can be used, for example, for tire portions of apparatuses for travelling and for various types of apparatuses such as robots, machine tools, etc.

BACKGROUND OF THE INVENTION

Japanese Patent Application Laid-Open No. 2004-211847 discloses a conventional power transmission apparatus applied to, for example, a conveyer or a garbage disposal. The power transmission apparatus can properly control an increase in its transmission capacity and reduction of its noise or vibration in accordance with a load exerted by a driven device, while reducing its size and saving space. The power transmission apparatus can transfer an input power to the driven device, and its power transmission mechanism is composed of a first inscribed meshing planetary gear mechanism and a second inscribed meshing planetary gear mechanism disposed in parallel on a power transmission path between an input shaft and an output shaft. The first inscribed meshing planetary gear mechanism includes a first external gear and a first internal gear which slightly differ in the number of teeth, the first external gear being disposed inside the first internal gear such that the first external gear can rotate eccentrically while maintaining the inscribed meshing. The second inscribed meshing planetary gear mechanism includes a second external gear and a second internal gear which slightly differ in the number of teeth, the second external gear being disposed inside the second internal gear such that the second external gear can rotate eccentrically while maintaining the inscribed meshing. The difference in the number of teeth between the first external gear and the first internal gear is rendered different from the difference in the number of teeth between the second external gear and the second internal gear, whereby the power transmitting characteristic of the first inscribed meshing gear mechanism is rendered different from that of the second inscribed meshing planetary gear mechanism.

The applicant of the present application has developed a compact, light weight cycloid speed reducer which includes a pair of cycloid gears and can be used for tire portions of, for example, an apparatus for or the developed cycloid speed reducer (see, for example, Japanese Patent Application Laid-Open No. 2017-48852). In the cycloid speed reducer, each of outer and inner pins is composed of a rolling bearing. Oil is supplied, for lubrication, to the outer ring of each outer pin by using a block-shaped lubricating member, and oil is supplied, for lubrication, to the outer ring of each inner pin by using a ring-shaped lubricating member. Furthermore, oil can be supplied, for lubrication, to a pair of cycloid gears via the outer pins and the inner pins. In this compact, light weight speed reduce, the durabilities of the cycloid gears, the outer pins, and the inner pins are enhanced by lubricating the cycloid gears, the outer pins, and the inner pins by using respective lubricating members, and frictional resistance can be lowered by reducing the friction between components.

Incidentally, in the conventional power transmission apparatus, the power transmitting characteristics of the first and second gear mechanisms provided in parallel are rendered different from each other by providing a difference between the difference in the number of teeth between the external gear and the internal gear of the first gear mechanism and the difference in the number of teeth between the external gear and the internal gear of the second gear mechanism. Therefore, the conventional power transmission apparatus is large in size, and rendering the conventional power transmission apparatus light and compact has been difficult. Also, in the cycloid speed reducer developed by the applicant of the present application, since a large number of lubricant supply members must be provided for the outer pins, the number of components increases, resulting in complex in structure and high cost. Further, since the support portions of the outer pins are composed of rolling bearings, rotation performance can be enhanced. However, use of rolling bearings results in high cost.

SUMMARY OF THE INVENTION

An object of the present invention is to solve the problem mentioned above and provide an improved compact, light weight cycloid speed reducer which can be used for tire portions of apparatuses for travelling and for various types of apparatuses such as robots, machine tools, etc. In the improved cycloid speed reducer, a reduction gear portion connected to one of relatively movable members is disposed in a housing which accommodates a piece of equipment, outer pins of the reduction gear portion are incorporated into the housing such that the outer pins form a sliding bearing, and a single outer pin lubricating ring is used for lubricating the outer pins so as to reduce the number of components. Inner pins in the form of rolling bearings are lubricated through a separator lubricating ring disposed between cycloid gears. Further, the outer ring of a cross roller bearing is connected to an end of the housing, and a boss plate serving as an output shaft of the reduction gear portion is fixed to the inner ring of the cross roller bearing which is rotatably supported by the outer ring via rollers. Oil is also supplied, for lubrication, to the pair of cycloid gears via the outer pins and the inner pins. Thus, the improved cycloid speed reducer has an improved transmission efficiency, has a reduced size and a reduced weight, and can be realized as a compact unit.

Means to Solve the Problems

The present invention relates to a cycloid speed reducer having a reduction gear portion comprising: an input shaft having a pair of eccentric portions which are located adjacent each other in an axial direction of the input shaft and which have a phase difference of 180° therebetween in a circumferential direction of the input shaft; a pair of cycloid gears which rotate in contact with outer circumferences of the corresponding eccentric portions; a boss plate which is located adjacent to the cycloid gears, rotatably supports the input shaft, and serves as an output shaft; an inner pin holder which is fixed to the boss plate, with the cycloid gears intervening between the inner pin holder and the boss plate, and which rotatably supports the input shaft; a plurality of outer pins which roll on peripheral tooth surfaces of tooth portions of the cycloid gears; a separator lubricating ring which is disposed between the pair of cycloid gears and is in sliding contact with the cycloid gears for lubrication; and a plurality of inner pins which roll on wall surfaces of a plurality of insertion holes formed in the cycloid gears and which are rotatably supported by the boss plate. The reduction gear portion is disposed in a cylindrical housing which accommodates a piece of equipment having an output shaft connected to the input shaft. The outer pins are spaced from one another in the circumferential direction along outer circumferences of the cycloid gears, and each outer pin is rotatably supported at its one end by an outer pin holder plate attached to the housing and is rotatably supported at its other end by the housing. An outer pin lubricating ring is slidably disposed on an inner circumferential surface of the housing, and each outer pin is in rotatable sliding contact with the outer pin lubricating ring and constitutes a sliding bearing.

The reduction gear portion is disposed in a circular recess formed in an end of the housing, and the outer pin lubricating ring is slidably disposed in an annular groove formed on the inner circumferential surface of the housing.

The annular groove formed in the housing has a rectangular cross section, and the outer pin lubricating ring is fitted into the annular groove such that a gap is formed between the outer pin lubricating ring and a wall surface of the annular groove, the outer pin lubricating ring slides within the annular groove as a result of rotation of the outer pins, and the gap serves as a lubricant reservoir.

The cycloid speed reducer further comprises a cross roller bearing which is attached to the end of the housing and which is composed of an outer ring fixed to the end and an inner ring rotatably supported by the outer ring through rollers, wherein the boss plate has a flange which is fitted into a space surrounded by the inner ring, and the flange has a radially extending portion fixed to the inner ring.

Each of the outer pin lubricating ring and the separator lubricating ring is composed of a porous molded member impregnated with lubricant.

Effects of the Invention

As described above, in the cycloid speed reducer of the present invention, the outer pins are incorporated into the housing for accommodating a piece of equipment such that the outer circumferential surfaces of the outer pins are in contact with the outer pin lubricating ring and the outer pins constitute a sliding bearing in cooperation with the outer pin lubricating ring, and the inner pins each composed of a rolling bearing can be lubricated by the separator lubricating ring. Thus, the outer pins and the inner pins are lubricated by the outer pin lubricating ring and the separator lubricating ring which are impregnated with lubricant. Specifically, the lubricant oozes from the two lubricating rings and is supplied to the outer pins, the inner pins, and the cycloid gears. As a result, the lubricant is distributed to all the members so as to reduce friction between components, thereby decreasing frictional resistance, whereby lubricant maintenance free can be realized. Further, the input shaft to which output of a motor is transmitted is connected to the boss plate via the cycloid speed reducer, the outer ring of the cross roller bearing is attached to the housing, the outer pins constitute a sliding bearing, and the boss plate serving as an output shaft is connected to the inner ring of the cross roller bearing. Therefore, the apparatus itself can be manufactured as a compact unit having a reduced weight and a reduced size. Further, it is possible to enhance the durability of components such as the cycloid gears, the outer pins, and the inner pins and to improve the transmission efficiency of the cycloid speed reducer.

DETAILED DESCRIPTION OF THE EMBODIMENT

An embodiment of the cycloid speed reducer of the present invention will now be described with reference to the drawings. The cycloid speed reducer is a compact, light weight cycloid speed reducer whose reduction gear portion is incorporated, as a unit, into a housing which accommodates another piece of equipment. The compact, light weight cycloid speed reducer can be attached to wheels such as tires of apparatuses for travelling and to various types of apparatuses such as robots, machine tools, etc. The cycloid speed reducer of the present invention is an improved version of the speed reducer for which the present applicant filed a patent application (see Japanese Patent Application Laid-Open No. 2017-48852). The cycloid speed reducer of the present invention is characterized mainly in that a circular lubricating ring 9 formed of a porous molded member impregnated with lubricant is incorporated into a housing 3 at a location where outer pins 6 slide, and the outer pins 6 and the lubricating ring 9 constitute a sliding bearing. A reduction gear portion 20 which constitutes the cycloid speed reducer is disposed in the cylindrical housing 3 which accommodates a motor 26 to which an input shaft 1 is connected. Therefore, the cycloid speed reducer of the present invention has a reduced weight and is compact. Since cycloid gears 11 and 12 and inner pins 7 of the present cycloid speed reducer are approximately identical with the components of the speed reducer disclosed in Japanese Patent Application Laid-Open No. 2017-48852, these components will be described only briefly.

Rotation of the above-mentioned input shaft 1, which is supported by the housing 3 via a bearing 22, etc., is input to the cycloid speed reducer of the present invention for speed reduction. The cycloid speed reducer includes the above-mentioned reduction gear portion 20. The reduction gear portion 20 is composed of the input shaft 1, the paired cycloid gears 11 and 12, a boss plate 2, an inner pin holder 5, the above-mentioned outer pins 6, a separator lubricating ring 10, and the above-mentioned inner pins 7. The input shaft 1 has a pair of eccentric portions 42 spaced from each other in the axial direction and having a phase difference of 180° therebetween. The paired cycloid gears 11 and 12 have center holes and rotate in contact with the outer circumferences of the eccentric portions 42. The boss plate 2 is located adjacent to the cycloid gears 11 and 12 and rotatably supports the input shaft 1. The inner pin holder 5 is fixed to the boss plate 2, with the cycloid gears 11 and 12 intervening therebetween, and rotatably supports the input shaft 1. The outer pins 6 roll on peripheral tooth surfaces of tooth portions 47 of the cycloid gears 11 and 12. The separator lubricating ring 10 is disposed between the paired cycloid gears 11 and 12 and is in sliding contact with the cycloid gears 11 and 12 for lubrication. The inner pins 7 roll on the wall surfaces of a plurality of insertion holes 36 formed in the cycloid gears 11 and 12 and are rotatably supported by the boss plate 2. In the case where another piece of equipment to be accommodated in the housing 3 is, for example, a motor 26, the stator of the motor 26 is fixed to the inner circumferential surface of the housing 3, and the rotatable rotor of the motor 26 is connected the input shaft 1. A housing end 29 to which a connector 38, etc. are attached is attached to an end of the housing 3.

Figure 1:
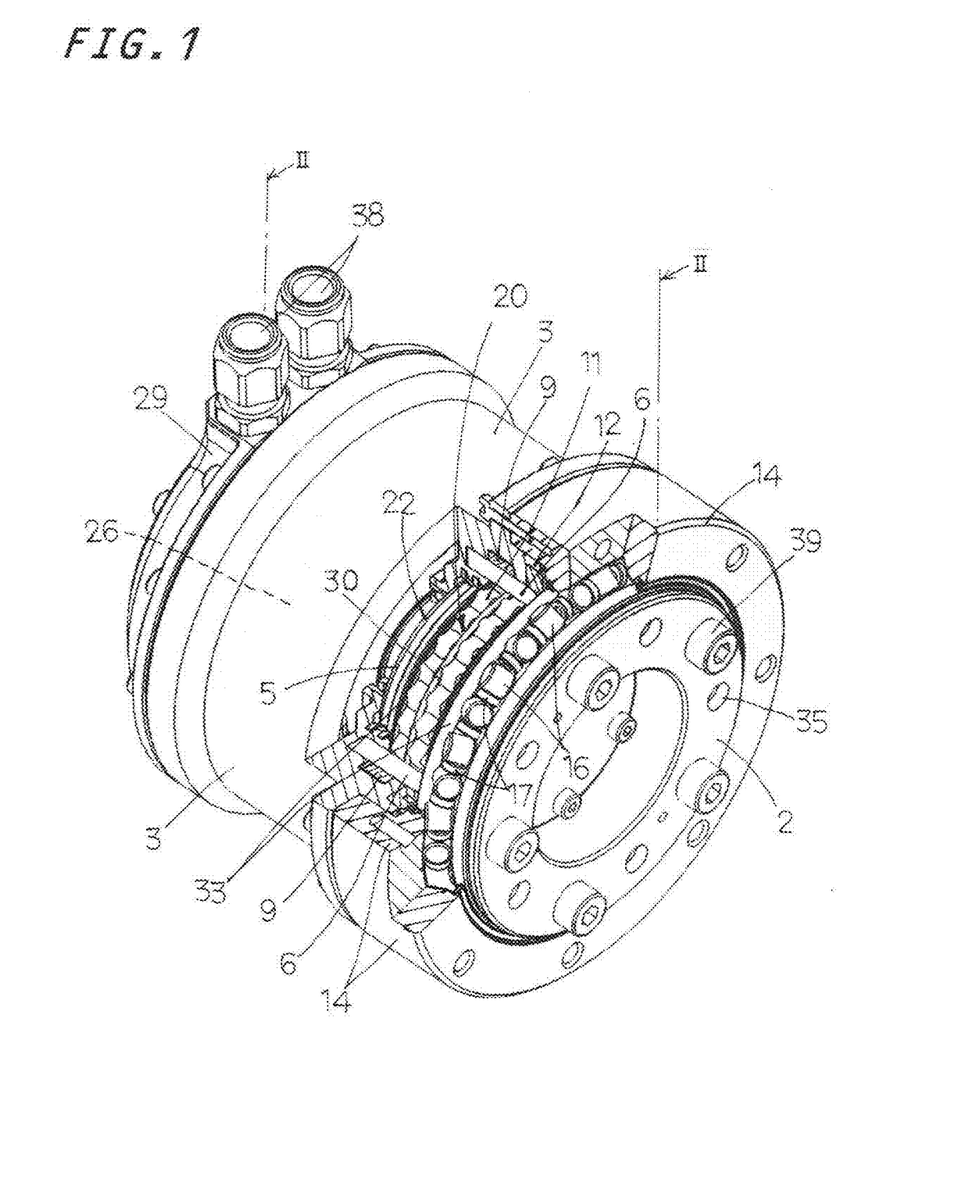
FIG. 1 is a partially sectioned perspective view of an in-wheel motor into which a reduction gear portion composed of a cycloid speed reducer of the present invention is incorporated.
Figure 2:
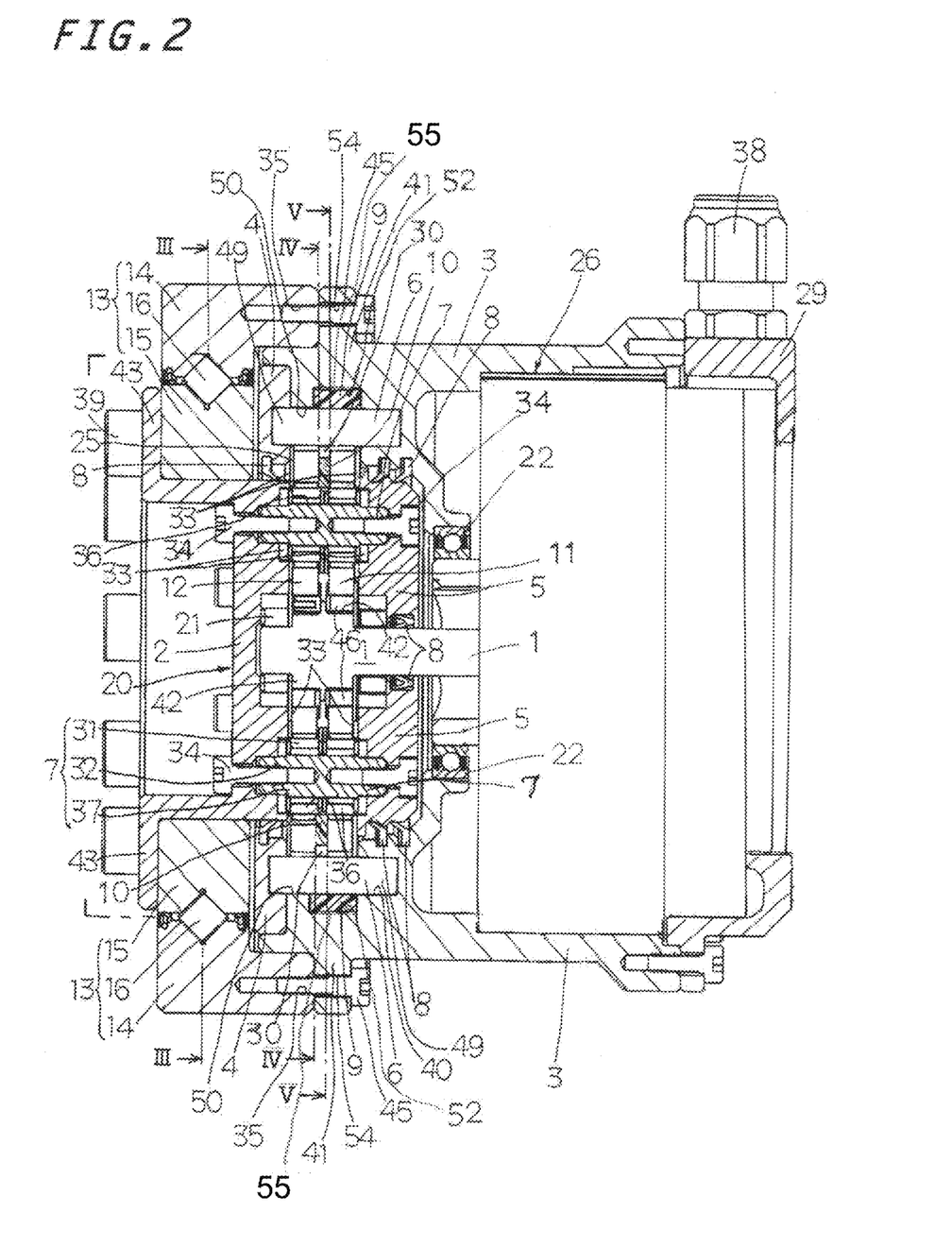
FIG. 2 is a sectional view of the in-wheel motor taken along line II-II in FIG. 1.
Figure 3:
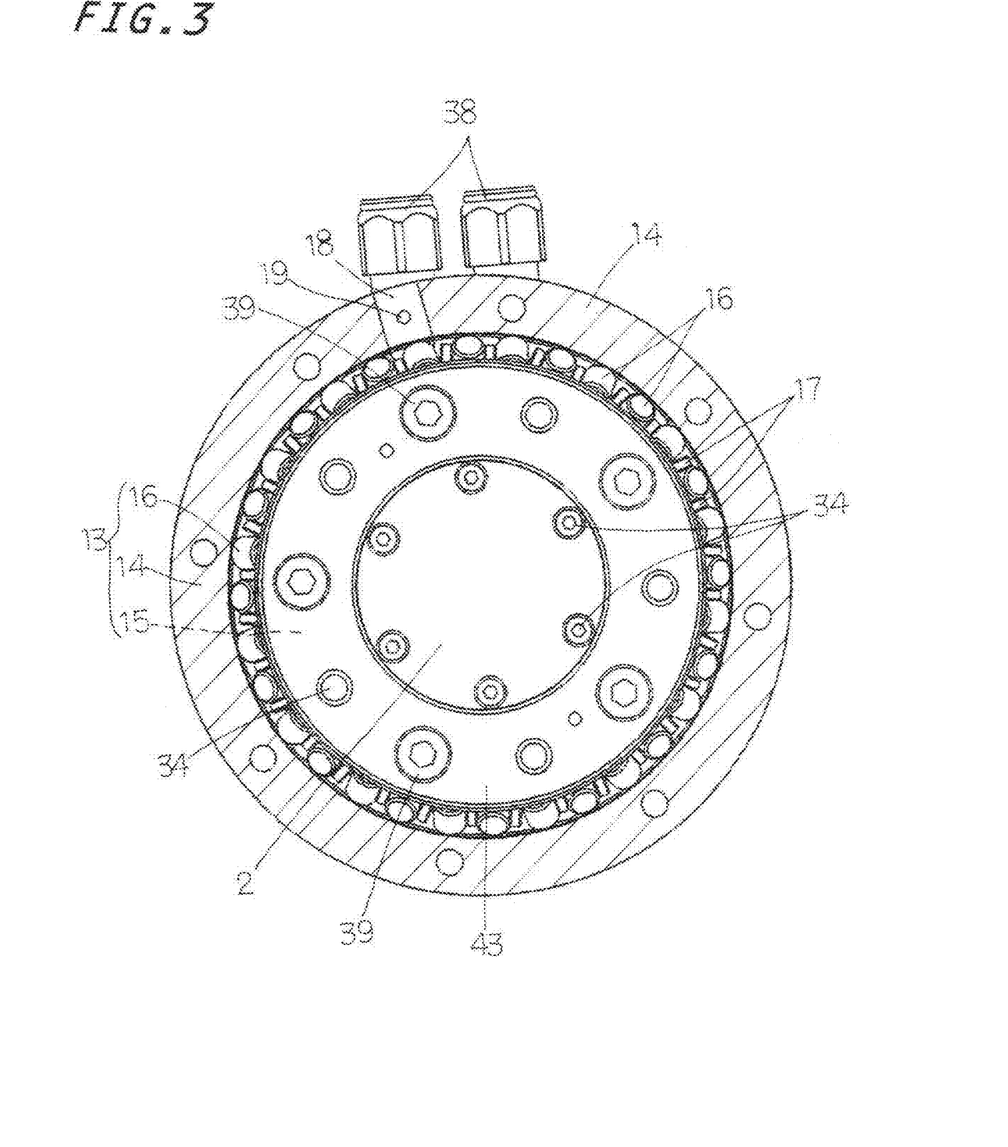
FIG. 3 is a side view of the in-wheel motor, with an outer ring of a cross roller bearing being sectioned along line III-III in FIG. 2.
Figure 4:
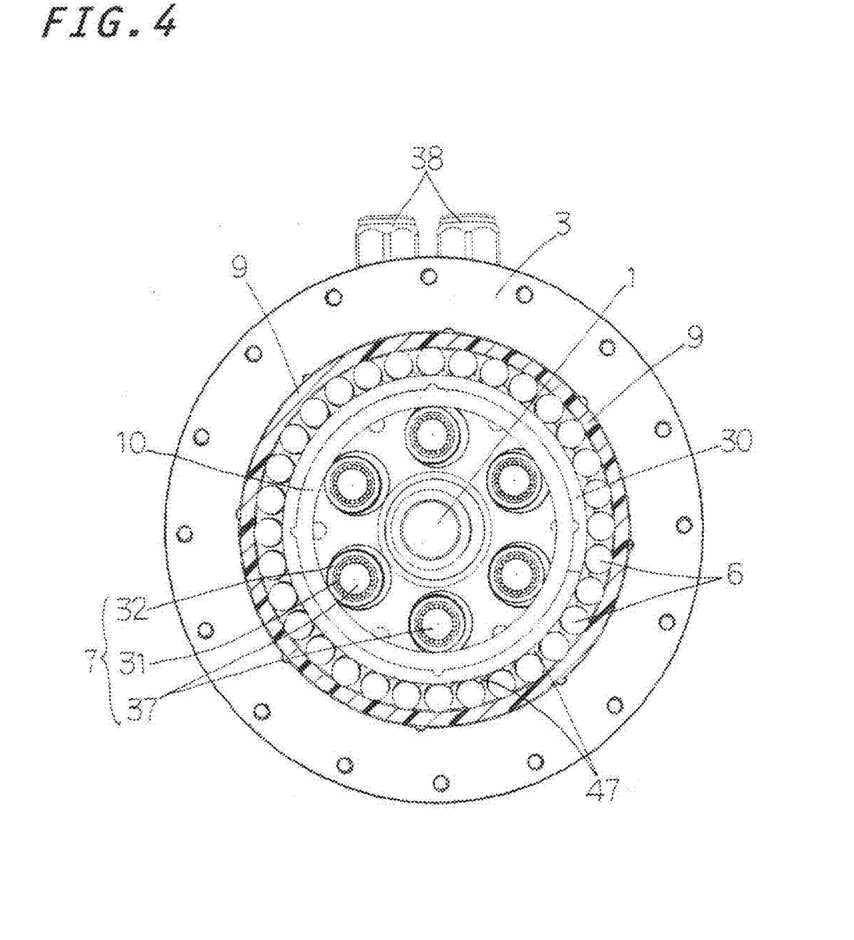
FIG. 4 is a sectional view of the in-wheel motor taken along line IV-IV in FIG. 2 and showing an outer pin lubricating ring and a separator lubricating ring of the reduction gear portion.
Figure 5:
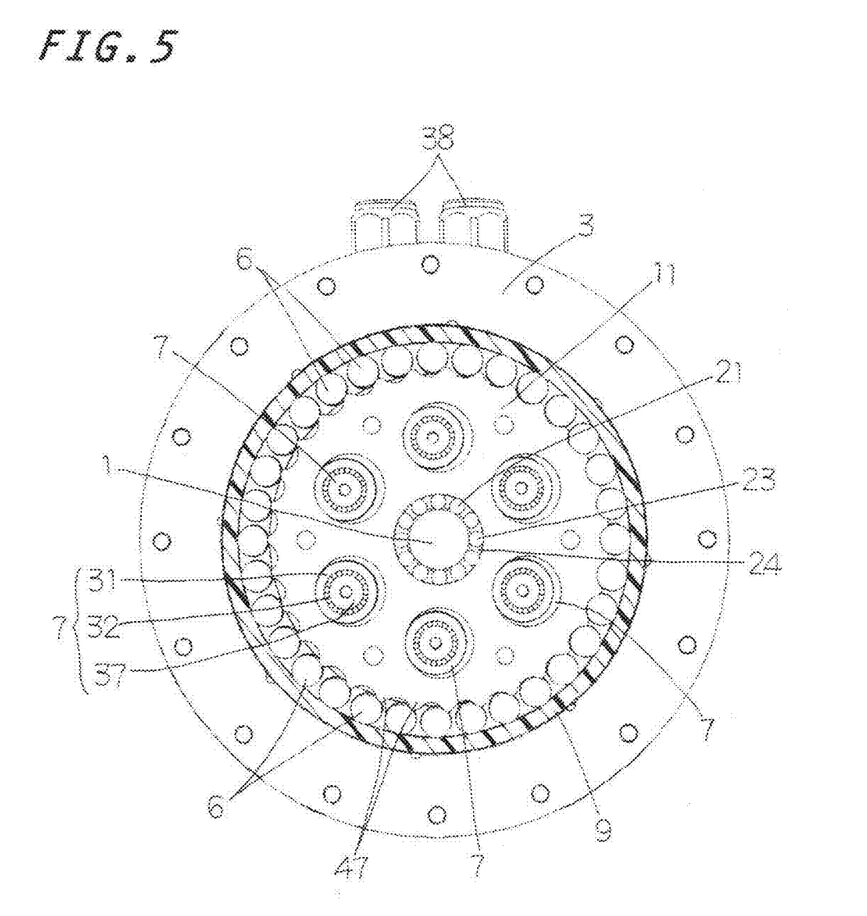
FIG. 5 is a sectional view of the in-wheel motor taken along line V-V in FIG. 2 and showing a cycloid gear and outer pins of the reduction gear portion.

The piece of equipment accommodated in the housing 3 of the cycloid speed reducer is not limited to the motor 26, and a clutch, a turbine, a generator, a generator-motor, or the like may be accommodated in the housing 3 as another piece of equipment. Since the reduction gear portion 20 is compactly accommodated in the housing 3 in which another piece of equipment (not shown) is accommodated, the apparatus itself can be manufactured as a compact unit. The cycloid speed reducer transmits drive power from the input shaft 1 attached to drive means, such as a motor, a generator, or the like, to the boss plate 2 (output shaft) through the paired cycloid gears 11 and 12 while reducing the rotational speed. In the cycloid speed reducer, the reduction gear portion 20 is accommodated in a circular recess 50 formed in an end 41 of the housing 3. First ends 49 of the outer pins 6, which constitute the reduction gear portion 20, are rotatably supported by an annular support groove 40 formed in the circular recess 50 of the housing 3. Second ends 49 of the outer pins 6 are rotatably supported by an outer pin holder plate 4 which is fixed to the housing 3 to face the annular support groove 40 (FIG. 2). In the cycloid speed reducer, an annular groove 52 is formed on the inner circumferential surface of the circular recess 50 for accommodating the reduction gear portion 20. In the reduction gear portion 20, which constitutes the cycloid speed reducer, is characterized particularly in that the opposite ends 49 of each outer pin 6 are engaged with the housing 3 and the outer pin holder plate 4 such that the opposite ends 49 constitute sliding bearings in cooperation with the housing 3 and the outer pin holder plate 4, and the outer pin lubricating ring 9 is slidably disposed in the annular groove 52 of the inner circumferential surface of the housing 3, so that the outer pin lubricating ring 9 lubricates the outer pins 6.

In the cycloid speed reducer, in order to dispose the components of the reduction gear portion 20 (the cycloid gears 11 and 12, the outer pins 6, the inner pins 7, etc.) in the circular recess 50 of the end 41 of the housing 3, the outer pin holder plate 4 is disposed in the circular recess 50 of the housing 3 such that the outer pin holder plate 4 faces the bottom of the circular recess 50 with a predetermined spacing therebetween. The outer pin holder plate 4 is fixed to the end 41 of the housing 3. Namely, the outer pin lubricating ring 9 is fitted into the annular groove 52 provided on the inner circumferential surface 51 of the housing 3 and having a rectangular cross section such that a gap 55 is formed between the outer pin lubricating ring 9 and the wall surface of the annular groove 52. Therefore, the outer pin lubricating ring 9 can slide within the annular groove 52 as a result of rotation of the outer pins 6, and the gap 55 associated with the annular groove 52 and located on the outer side of the outer pins 6 functions as a lubricant reservoir. The separator lubricating ring 10 is interposed between the cycloid gears 11 and 12 and is in contact with the inner pins 7 and the corresponding end surfaces of the cycloid gears 11 and 12 for supply of the lubricant. A gear separator ring 30 formed of POM (polyoxymethylene or polyacetal) is disposed between the two cycloid gears 11 and 12. The separator lubricating ring 10 is located on the radially inner side of the gear separator ring 30, and the inner circumferential surface of the separator lubricating ring 10 is in contact with the outer circumferential surfaces of the outer rings 31 of the inner pins 7. The lubricant supplied from the separator lubricating ring 10 to the corresponding end surfaces of the cycloid gears 11 and 12 reduces frictional resistance produced as a result of sliding contact between the gear separator ring 30 and the cycloid gears 11 and 12. The lubricant supplied to the corresponding end surfaces of the cycloid gears 11 and 12 is supplied from the gear surfaces to the outer circumferential surfaces of the outer rings 31 of the inner pins 7, whereby the outer circumferential surfaces of the outer rings 31 are lubricated.

The cycloid speed reducer includes a cross roller bearing 13 attached to the end 41 of the housing 3. The cross roller bearing 13 is composed of an outer ring 14 disposed at the end 41 of the housing 3 and an inner ring 15 rotatably supported by the outer ring 14 via rollers 16. The boss plate 2 has a flange 43 which protrudes from an end surface of the inner ring 15 and is fixed to the inner ring 15. The boss plate 2 is rotatably supported via the cross roller bearing 13 whose outer ring 14 is fixed to a flange 43 protruding from the outer circumferential surface of one end of the housing 3. The boss plate 2 is fitted into a space surrounded by the inner ring 15 of the cross roller bearing 13 from the side toward the outer end surface of the inner ring 15 and is fixed to the inner circumferential surface of the inner ring 15. The boss plate 2 has a hat-like shape.

Each of the outer pin lubricating ring 9 and the separator lubricating ring 10 is a porous molded member impregnated with lubricant. Specifically, each of the lubricating rings 9 and 10 is, for example, a porous sintered resin member, which is formed by compacting a powdery material under application of heat so as to mold the resin member and filling the pores of the molded resin member with lubrication oil serving as lubricant. As shown in FIG. 2, the separator lubricating ring 10 is fitted into a space surrounded by the inner circumferential surface of the gear separator ring 30 disposed between the cycloid gears 11 and 12 whereby the separator lubricating ring 10 is supported by the gear separator ring 30. The separator lubricating ring 10 is in contact with the inner pins 7 and lubricates the inner pins 7.

Each outer pin 6 is supported at its one end by the outer pin holder plate 4 and at its other end by the annular support groove 40, which is formed in the housing 3 supporting the outer pin holder plate 4, such that the outer pins 6 are spaced from one another in the circumferential direction and can rotate individually. The cycloid speed reducer is characterized particularly in that the outer pin lubricating ring 9, which is in contact with the outer circumferential surfaces of the outer pins 6 for lubrication and allows rotation of the outer pins 6, is in sliding contact with the inner circumferential surface 51 of the housing 3. The outer pins 6 and the outer pin lubricating ring 10 constitute a sliding bearing.

The input shaft 1 is rotatably supported by the boss plate 2 via bearings 21. Portions of the input shaft 1 at which the boss plate 2 and the inner pin holder 5 are located have a smaller diameter, and a portion of the input shaft 1 at which the paired cycloid gears 11 and 12 are located has a larger diameter. The paired cycloid gears 11 and 12 are configured to rotate in contact with the outer circumferences of the eccentric portions (eccentric cams) 42 of the input shaft 1 via rollers 23 which constitute eccentric portion bearings. In this cycloid speed reducer, eccentric portion bearing guide plates are disposed between the rollers 46 of the eccentric portion bearings and the bearings 21 which rotatably support the input shaft 1. The eccentric portion bearing guide plates are formed of PEEK (polyether ether ketone) which is a thermoplastic resin for reducing frictional resistance.

In this cycloid speed reducer, in order to prevent the lubricant within the reduction gear portion 20 from leaking from the input shaft 1 side to the side where the piece of equipment is present, seals 8 are disposed on the inner circumferential surface 51 of the housing 3, which does not rotate. Specifically, seals 8 formed of rubber are provided on the inner circumferential surface 51 (located on the radially inner side) of the housing 3 and the inner circumferential surface (located on the radially inner side) of the outer pin holder plate 4. Lip portions of the seals 8 are in contact with the outer circumference surface (located on the radially outer side) of the rotating boss plate (output shaft) 2 and the outer circumference surface (located on the radially outer side) of the inner pin holder 5. Another seal 8 is provided for the input shaft 1 in order to prevent the lubricant from leaking from the reduction gear portion 20 toward the piece of equipment. Each seal 8 is incorporated such that the lip portion of the seal 8 is in contact with a rotating member such as the input shaft 1, the boss plate 2, the inner pin holder 5, or the like and the lip is directed toward the reduction gear portion 20, whereby leakage of the lubricant from the interior of the reduction gear portion 20 is prevented.

The boss plate 2 is supported by the housing 3 through the cross roller bearing 13. The cross roller bearing 13 is composed of the outer ring 14, the inner ring 15, the plurality of rollers 16 disposed between the outer ring 14 and the inner ring 15, and a plurality of separators 17 disposed between the rollers 16. The outer ring 14 has mounting screw holes 35. The outer ring 14 is fixed to the housing 3 by using screws 45 which are screwed into the mounting screw holes 35. The inner ring 15 is fixed to the boss plate 2 by using fixing screws 39. In the cycloid speed reducer, the boss plate 2 has a plurality of attachment holes (not shown) formed in the flange 43, and the inner ring 15 has a plurality of mounting screw holes (not shown). Fixing screws 39 are passed through the attachment holes of the flange 43 of the boss plate 2 and are screwed into the mounting screw holes of the inner ring 15, whereby the boss plate 2 is fixed to the inner ring 15. Also, the housing 3 has a plurality of attachment holes 54, and the outer ring 14 has a plurality of mounting screw holes 35 which are spaced from each other in the circumferential direction. In the cycloid speed reducer, fixing screws 45 are passed through the attachment holes 54 of the housing 3 and screwed into the mounting screw holes 35 of the outer ring 14, whereby the outer ring 14 is fixed to the housing 3. The outer ring 14 has an insertion hole (not shown) for inserting the rollers 16 and the separators 17 into a space between the outer ring 14 and the inner ring 15, and a cap 18 is fitted into the insertion hole. The cap 18 is fixed to the outer ring 14 by a pin 19.

In general, each inner pin 7 is constituted by a rolling bearing 53 composed of an outer ring 31, an inner pin 37, and needle roller 32. Each inner pin 7 is fixed to the boss plate 2 by an inner pin fixing pin 34. The outer ring 31 is constituted, for example, by a miniature cam follower. The two outer rings 31 fitted into the inserting holes 36 of the cycloid gears 11 and 12 are supported by a single inner pin 37. Side plates 33 formed of a metal are disposed on the opposite axial ends of each inner pin 7. Thrust washers 25 formed of, for example, PEEK (polyether ether ketone) which is a thermoplastic resin for reducing frictional resistance are disposed between the outer pin holder plate 4 and the cycloid gears 11 and 12 and between the side plates 33 and the needle rollers 32. Also, a collar formed of a metal and a pair of thrust washers 25 formed of PEEK are disposed on each inner pin 7 to be located between adjacent two outer rings (cam followers) 31. Notably, solid lubricant may be incorporated into the rolling bearing. The solid lubricant can be manufactured, for example, by mixing lubrication oil and powder of ultrahigh molecular weight polyethylene, followed by sintering.

The input shaft 1 is integrated, at its one end, with the rotor of the motor 26, and a portion of the input shaft 1 on the other end side is a region where the cycloid gears 11 and 12 are attached and is formed into the eccentric portions 42. The eccentric portions 42 of the input shaft 1 are supported, on opposite sides, by retainers 24 which retain the rollers 23. In the cycloid speed reducer, the boss plate 2 serving as an output shaft is screw-fixed to the inner ring 15 of the cross roller bearing 13 by using the fixing screws 39. A member to be attached such as a tire can be fixed to the inner ring 15, together with the boss plate 2, by using the fixing screws 39.

The cycloid speed reducer is configured as described above and has a power transmission path as described below. When a switch of a mechanical apparatus such as an apparatus for travelling is turned on, the input shaft 1 rotates. The input shaft 1 has the two eccentric portions 42 having a phase difference of 180° therebetween, and the cycloid gears 11 and 12 are disposed on the eccentric portions 42 such that the cycloid gears 11 and 12 rotate in contact with the outer circumferences of the eccentric portions 42 via the rollers 46 of the eccentric portion bearings. As a result of rotation of the input shaft 1, the cycloid gears 11 and 12 rotate eccentrically through the eccentric portions 42. The cycloid gears 11 and 12 have the insertion holes 36 and the tooth portions 47 formed along the outer circumferences thereof. Each outer pin 6 is supported, at its one end 49, by the outer pin holder plate 4 and rotates while being in contact with the teeth 47 of the outer circumferential surfaces of the cycloid gears 11 and 12. The inner pins 7 fixed to the inner pin holder 5 are inserted into the inserting holes 36 formed in the cycloid gears 11 and 12. Therefore, the outer rings of the inner pins 7 rotate while rolling on the inner circumferential surfaces of the insertion holes 36 of the cycloid gears 11 and 12. Namely, the cycloid gears 11 and 12, which function as planetary gears, revolve at high speed and simultaneously rotate at low speed through the eccentric portion bearings of the eccentric portions 42 of the input shaft 1. When the cycloid gears 11 and 12, which function as planetary gears, rotate about their axis, the inner pins 7 rotate with the rotation of the cycloid gears 11 and 12, and the boss plate 2, which serves as an output shaft, rotates through the rotating inner pins 7.

What is claimed is:

1. A cycloid speed reducer having a reduction gear portion comprising:
    an input shaft having a pair of eccentric portions which are located adjacent each other in an axial direction of the input shaft and which have a phase difference of 180° therebetween in a circumferential direction of the input shaft;
    a pair of cycloid gears which rotate in contact with outer circumferences of the corresponding eccentric portions;
    a boss plate which is located adjacent to the cycloid gears, rotatably supports the input shaft, and serves as an output shaft;
    an inner pin holder which is fixed to the boss plate, with the cycloid gears intervening between the inner pin holder and the boss plate, and which rotatably supports the input shaft;

a plurality of outer pins which roll on peripheral tooth surfaces of tooth portions of the cycloid gears;

a separator lubricating ring which is disposed between the pair of cycloid gears and is in sliding contact with the cycloid gears for lubrication; and a plurality of inner pins which roll on wall surfaces of a plurality of insertion holes formed in the cycloid gears and which are rotatably supported by the boss plate, wherein the reduction gear portion is disposed in a cylindrical housing which accommodates a piece of equipment having an output shaft connected to the input shaft;

wherein the outer pins are spaced from one another in the circumferential direction along outer circumferences of the cycloid gears, and each outer pin is rotatably supported at its one end by an outer pin holder plate attached to the housing and is rotatably supported at its other end by the housing; and wherein an outer pin lubricating ring is slidably disposed on an inner circumferential surface of the housing, and each outer pin is in rotatable sliding contact with the outer pin lubricating ring and constitutes a sliding bearing, wherein the reduction gear portion is disposed in a circular recess formed in an end of the housing, and the outer pin lubricating ring is slidably disposed in an annular groove formed on the inner circumferential surface of the housing, and wherein the annular groove formed in the housing has a rectangular cross section, and the outer pin lubricating ring is fitted into the annular groove such that a gap is formed between the outer pin lubricating ring and a wall surface of the annular groove, the outer pin lubricating ring slides within the annular groove as a result of rotation of the outer pins, and the gap serves as a lubricant reservoir.

2. The cycloid speed reducer according to claim 1, further comprising a cross roller bearing which is attached to the end of the housing and which is composed of an outer ring fixed to the end of the housing and an inner ring rotatably supported by the outer ring through rollers, wherein the boss plate has a flange which is fitted into a space surrounded by the inner ring, and the flange has a radially extending portion fixed to the inner ring.

3. The cycloid speed reducer according to claim 1, wherein each of the outer pin lubricating ring and the separator lubricating ring is composed of a porous molded member impregnated with lubricant.

* * * * *